United States Patent
Jones et al.

[11] Patent Number: 6,125,614
[45] Date of Patent: Oct. 3, 2000

[54] METHOD FOR MAKING LAMINATED PAGE

[75] Inventors: Gordon W. Jones, Hixson; Hubert F. Brown, Charleston; Lyudmila Feldman, Signal Mountain, all of Tenn.

[73] Assignee: Arcade, Inc., New York, N.Y.

[21] Appl. No.: 09/209,816

[22] Filed: Dec. 11, 1998

Related U.S. Application Data

[62] Division of application No. 08/791,875, Jan. 31, 1997, Pat. No. 5,928,748.

[51] Int. Cl.⁷ .............................. B65B 9/06; B65B 11/08
[52] U.S. Cl. ................................ 53/461; 53/455; 53/460
[58] Field of Search .............................. 53/460, 455, 461, 53/449, 450, 412, 562, 172, 170, 550, 553, 546, 545, 133.8, 206, 205

[56] References Cited

U.S. PATENT DOCUMENTS

| | | |
|---|---|---|
| 3,116,077 | 12/1963 | Bird . |
| 3,718,277 | 2/1973 | Volkert . |
| 3,998,684 | 12/1976 | McRight . |
| 4,083,451 | 4/1978 | Hair . |
| 4,313,557 | 2/1982 | Foffel . |
| 4,484,768 | 11/1984 | Norfleet . |
| 4,612,223 | 9/1986 | Spector . |
| 4,752,496 | 6/1988 | Fellows et al. . |
| 4,824,707 | 4/1989 | Spector . |
| 4,876,136 | 10/1989 | Chang et al. ........................... 428/130 |
| 4,923,063 | 5/1990 | Tararuj . |
| 4,941,574 | 7/1990 | Meehan . |
| 4,998,621 | 3/1991 | Meehan . |
| 5,161,688 | 11/1992 | Munchin . |
| 5,188,236 | 2/1993 | Sayers et al. . |
| 5,242,521 | 9/1993 | Hibsch et al. . |
| 5,248,537 | 9/1993 | Giannavola . |
| 5,268,209 | 12/1993 | Hunt et al. . |
| 5,268,214 | 12/1993 | Charbonneau . |
| 5,337,897 | 8/1994 | Yablans . |
| 5,389,174 | 2/1995 | Hibsch et al. . |
| 5,391,420 | 2/1995 | Bootman et al. . |
| 5,419,958 | 5/1995 | Charbonneau . |
| 5,439,172 | 8/1995 | Comyn et al. . |
| 5,534,105 | 7/1996 | Boyd . |
| 5,609,710 | 3/1997 | Charbonneau ......................... 156/276 |
| 5,645,161 | 7/1997 | Whitaker et al. . |
| 5,715,849 | 2/1998 | Vanbraekel . |

FOREIGN PATENT DOCUMENTS

| | | |
|---|---|---|
| 0 268 316 A1 | 10/1996 | European Pat. Off. . |
| WO 92/14607 | 9/1992 | WIPO . |
| WO 94/05182 | 3/1994 | WIPO . |
| WO 95/33619 | 12/1995 | WIPO . |
| WO 96/34808 | 11/1996 | WIPO . |

*Primary Examiner*—James F. Coan
*Attorney, Agent, or Firm*—Pennie & Edmonds LLP

[57] ABSTRACT

A laminated page having a carrier sheet; two barrier plies, at least one of which is laminated to the carrier sheet; and sample material enclosed between the two barrier plies. The present invention also relates to a method of making the laminated page, including a mass manufacturing method in a single pass on a printing press.

14 Claims, 11 Drawing Sheets

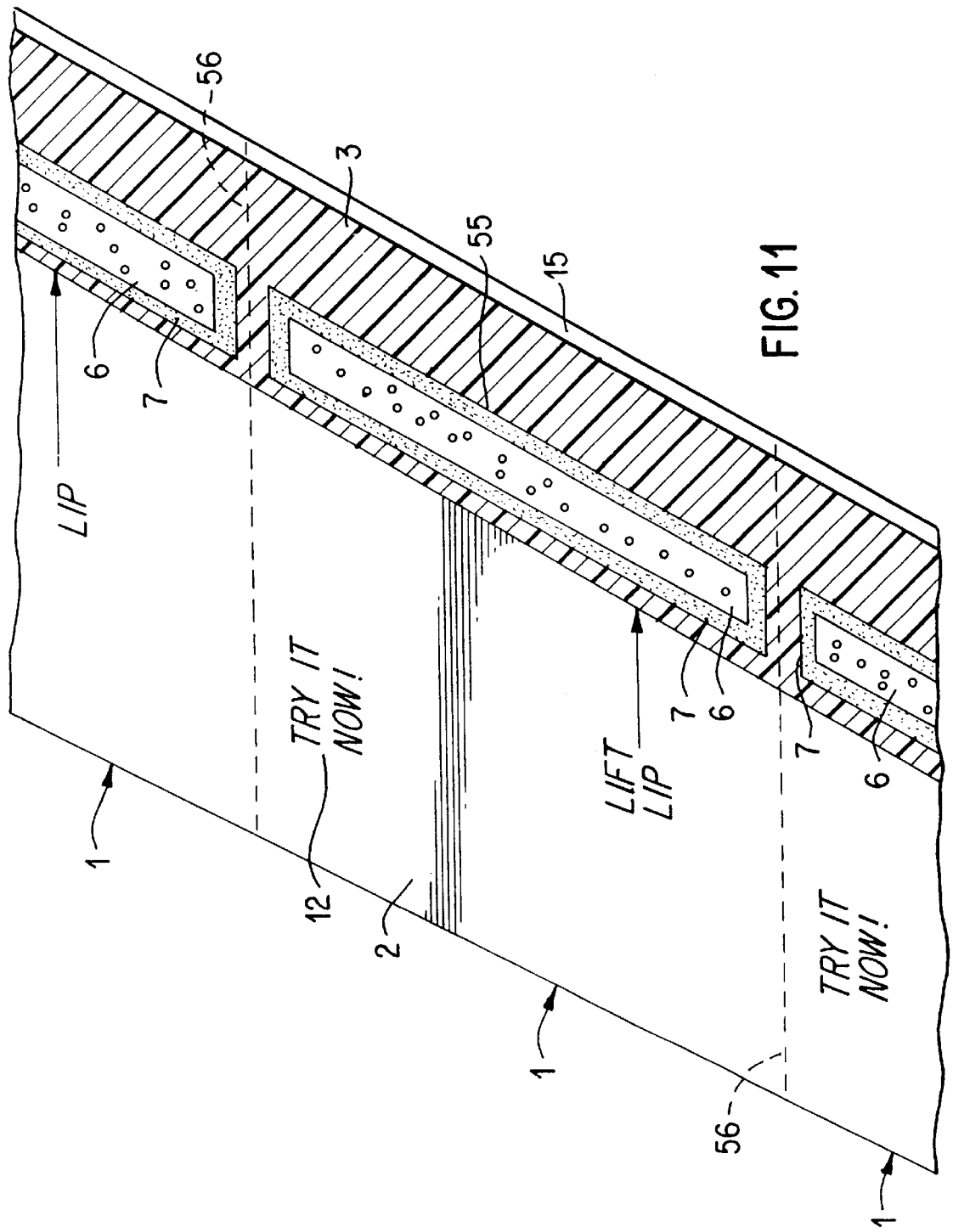

METHOD FOR MAKING LAMINATED PAGE

This is a divisional of application Ser. No. 08/791,875 filed Jan. 31, 1997, now U.S. Pat. No. 5,928,748.

FIELD OF INVENTION

The present invention relates generally to a laminated page and more specifically to a partially or fully laminated page having a carrier sheet and a barrier ply for containing one or more sample materials. The invention also relates to methods for making the laminated page.

BACKGROUND OF INVENTION

Manufacturers of a variety of products, especially perfume and other cosmetics, often distribute small samples of their products to potential customers. This task is accomplished by enclosing sample material in a sampler device, which is then distributed directly to potential customers or included in magazines or other publications which are then distributed to and read by potential customers.

In order to catch and maintain the interest of present and potential customers, variety in the types and looks of sampler devices is necessary. One common sampler device, known in the art as a ScentStrip® sampler, is used to distribute perfume samples and generally comprises a sheet of paper, which has been folded one or more times to create panels, and an encapsulated fragrance contained between the panels of the paper sheet. The panels are releasably attached or fastened, such that the consumer can lift one of the panels to access the fragrance when desired. Alternatively, one of the panels can be perforated such that the consumer removes a tear strip or zip strip to access the sample material.

Not only do sampler devices allow potential customers to sample a product, these devices also serve an important advertising function. For example, artwork or advertising text is often printed on sampler devices before their distribution. Effective artwork can attract attention to the sampler device, entice a potential customer to try the sample, and thereby gain new customers for the manufacturer of the sampled product. Widespread distribution of these sampler devices and effective methods for their mass manufacturing, especially as part of the printing process, are therefore highly desirable.

During manufacturing and distribution of sampler devices, it is desirable to prevent migration of the sample material components through the sampler device. This prevents premature exposure of the sample material and prevents the magazine or publication within which the sampler device is bound from being damaged or defaced by the sample material.

Prior art sampler devices are most frequently made of paper, and most paper is permeable to liquids and/or volatile materials present in many sample materials such as cosmetics or perfumes. Thus, a sampler device which does not provide a substantial barrier between the sample material and the paper will allow the sample material or its components to migrate through the paper, resulting in unwanted premature exposure or release ("pre-release") of the sample material. One way to address this problem is to treat the paper with a substance which renders the sampler device substantially impervious to the sample material. Thus the migration of the sample material will be substantially retarded. Such a treated-paper sampler device is disclosed in U.S. Pat. No. 5,419,958 to Charbonneau. Manufacture of the Charbonneau device involves treating a sample area on a paper substrate or paper sheet with volatile liquid containment treatment, drying the coating, and crosslinking. To perform the drying and curing steps on the press, disproportionately large industrial ovens would be required in the printing path. This becomes especially impractical when several sequential coats are applied. Another drawback associated with increasing the thickness of the treatment material is curling of the paper substrate caused by shrinkage of the treatment material. Because the effectiveness of the treatment depends on the chemical and physical properties of the paper substrate, only certain types of paper are suitable for the treatment process. Many types of inexpensive papers, such as un-sized, recycled, light-weight, or high-bulk paper, may not be suitable for use in this type of device. Furthermore, the treatment process does not allow for pre-inspection of the materials to confirm that the required barrier protection exists. The treated substrate can be tested only after the manufacturing process is completed, and if the treatment provides an inadequate barrier the entire process must be repeated. Additionally, the coating process may interfere with the appearance of printed advertising material or artwork on the substrate page underneath the coating material.

U.S. Pat. No. 5,248,537 to Giannavola also discloses a sampler device comprising a substrate upon which a coating has been applied. The coating disclosed is 1 mm thick and requires heating at 250° to 350° for curing. Such an extreme thickness may be unacceptable for many applications, such as magazine pages.

Another device which addresses the pre-release problem is disclosed by U.S. Pat. No. 5,439,172 to Comyn et al. Comyn et al. teaches a two-layer sampler device which is made entirely from a vapor proof material such as sheet plastic. The Comyn device is produced in rolls and is not an integral part of a printed page. Therefore, additional equipment and personnel are needed in order to attach the device to a page, thus adding to the cost of manufacture. The differential in the speeds of these multiple, discontinuous steps makes this process generally more complex and generally more expensive.

In addition, U.S. Pat. No. 5,391,420 to Bootman et al. discloses a fragrance-laden pouch sampler and process for manufacturing the sampler. The Bootman pouch comprises two plastic barrier film layers which are sealed together to contain a fragrance sample. In the manufacturing process disclosed in Bootman, these pouches are mass produced and ultimately wound into rolls. Then the pouches may be separated from the rest and distributed individually, or they may be included in magazines by attaching one of the barrier film layers of each pouch to pages in the magazine. As in Comyn, the pouches are not an integral part of a printed page. Thus, a magazine sampler using the Bootman device requires multiple, discontinuous steps to construct the pouch and then attach it to the advertising page. And again, the differential in the speeds of these multiple, discontinuous steps makes this process generally more complex and generally more expensive.

Yet another sealed sampler device is disclosed in U.S. Pat. No. 5,161,688 to Muchin. Muchin discloses a device made up of at least three layers: a base ply with a hole therethrough, a closure ply on one side of the base ply, and a removable film ply which covers the other side of the base ply and seals a sample material within the hole. Once this device is constructed, it may be incorporated into a magazine by attaching the closure ply to a page in the magazine. As with Comyn et al. and Bootman et al., the device is not an integral part of a printed page. Therefore, attachment of the device to a page is an additional, discontinuous step which adds complexity to the process.

U.S. Pat. No. 5,534,105 to Boyd relates to a method and apparatus for sealing a scent slurry during a printing process. The Boyd method comprises applying a microencapsulated scent slurry to a continuous web of substrate material and then covering the scent slurry with an impermeable material. The impermeable material is adhered to the substrate web, but not to the microencapsulated scent slurry. Boyd also contemplates placing a second sheet of impermeable material on the opposite side of the substrate. The Boyd method does not isolate the scent slurry from the substrate web, which is typically paper. The method also does not contemplate fragrance release by rupturing microcapsules in a pull-apart action. The apparatus disclosed in Boyd is a device specially constructed to achieve the method disclosed in Boyd.

In addition to the pre-release problem, many sampler devices have other functional limitations which reduce the range of materials which may be used in their construction. For example, in prior art sampler devices such as the ScentStrip® sampler, the fragrance is microencapsulated to meet current U.S. postal regulations for minimizing pre-release. Key components of a volatile material, such as a fragrance, may be lost in the process of microencapsulation, thereby resulting in a less accurate rendition, or impairing the fragrance or sample material. Also, there is a severe restriction on the types of materials that may be used to enclose sample materials. Most sample materials, including fragrance microcapsules and the like, are highly sensitive to both the chemistry of the enclosing materials and the process by which the enclosing materials are manufactured. For example, the alkaline manufacturing process used for publishing paper presents a problem for sample materials which may be sensitive to the pH of the paper. In addition, certain recycled paper may not be used for some sampler devices because direct exposure to the contents of certain liquid sample materials can release latent odors in the paper which may alter the smell of scent samples.

There is therefore a need for a sampler device which substantially isolates the sample material from the carrier sheet; reduces permeation of the sample material components through the sampler device; may be constructed from a large selection of inexpensive, widely-available materials which may be pre-inspected to provide high reliability; provides a greater degree of creative flexibility; and can be quickly and inexpensively produced in mass quantities. There is also a need for a method of making such sampler devices including a "one-pass," in-line, or continuous-motion printing process.

SUMMARY OF THE INVENTION

The present invention relates to a laminated page comprising a carrier sheet and at least one sample material enclosed between a first barrier ply and a second barrier ply, wherein at least one barrier ply is laminated to the carrier sheet.

The present invention also relates to a laminated page comprising a carrier sheet having two panels, each panel having a plurality of edges, a first barrier ply laminated to an outside surface of the first panel, a second barrier ply laminated to an outside surface of the second panel and at least one sample material enclosed between an inside surface of the first panel and an inside surface of the second panel, the sample material and at least a portion of the carrier sheet located between the barrier plies.

The present invention also relates to a method of making a laminated page by providing a first barrier ply and a second barrier ply, laminating at least one barrier ply to a carrier sheet, depositing at least one sample material onto at least one barrier ply, and enclosing the at least one sample material between the barrier plies.

The present invention also relates to a method of making a laminated page by providing a first carrier sheet panel and a second carrier sheet panel, laminating a first barrier ply to an outside surface of the first panel, laminating a second barrier ply to an outside surface of the second panel, depositing at least one sample material onto the inside surface of at least one panel of the carrier sheet, and enclosing at least one sample material between the two panels of the carrier sheet.

The present invention also relates to a method of making a plurality of laminated pages by providing a plurality of first barrier ply ribbons and a plurality of second barrier ply ribbons, laminating at least one of the plurality of first barrier ply ribbons and the plurality of second barrier ply ribbons to a carrier sheet web, depositing portions of sample material onto at least one of the plurality of first barrier ply ribbons and the plurality of second barrier ply ribbons, slitting the carrier sheet web into a plurality of carrier sheet streams, each carrier sheet stream having at least one barrier ply ribbon laminated thereto, enclosing the portions of sample material between the plurality of first barrier ply ribbons and the plurality of second barrier ply ribbons, and cutting each carrier sheet stream and first and second barrier ply ribbon into individual laminated pages, wherein each laminated page contains at least one portion of sample material.

The present invention also relates to a method of making a plurality of laminated pages by providing a plurality of first barrier ply ribbons and a plurality of second barrier ply ribbons, laminating the plurality of first barrier ply ribbons and the plurality of second barrier ply ribbons to a carrier sheet web, depositing portions of sample material onto the carrier sheet web, slitting the carrier sheet web into a plurality of carrier sheet streams, each carrier sheet stream having at least one first barrier ply ribbon and at least one second barrier ply ribbon laminated thereto, folding each carrier sheet stream, thereby forming a first panel and a second panel, the first panel comprising a portion of the carrier sheet stream and the first barrier ply ribbon, the second panel comprising another portion of the carrier sheet stream and the second barrier ply ribbon, and thereby enclosing the portions of sample material between the first and second panels, and cutting each carrier sheet stream, each first barrier ply ribbon and each second barrier ply ribbon into individual laminated pages, wherein each laminated page contains at least one portion of sample material.

The laminated page of the present invention has several advantages over the sampler devices of the prior art. These advantages will be briefly set forth here and explained in greater detail below. For example, the laminated page prevents substantial pre-release of the sample material. Some embodiments of the laminated page of the present invention also substantially isolate the sample material from the carrier sheet, which allows the use of a wider range of materials for the carrier sheet because compatibility between the carrier sheet and the sample material is no longer an issue. Furthermore, this substantial isolation allows the use of a wider range of sample materials which may not be applied directly to a carrier sheet without some undesirable reaction between the sample material and the carrier sheet. The laminated page of the present invention also provides more freedom as to the form of sample material which may be used. For instance, many prior art sampler devices are limited to use with microencapsulated sample materials. The laminated page of the present invention, however, is compatible with sample materials in the form of liquids, solids, gels, lotions, and powders, as well as many other forms. The substantial isolation of the sample material from the carrier sheet also minimizes physical and chemical interaction between the sample material and the carrier sheet, which preserves the nature and quality of the sample material. For example, in the laminated page of the present invention, the aroma of a liquid or microencapsulated fragrance sample will not be altered by interaction with the carrier sheet. The laminated page of the present invention also provides greater creative flexibility, in that artwork and the like may be displayed on a greater portion of the laminated page without concern of interaction with the sample material, and a greater variety of aesthetically pleasing materials may be used in the construction of the laminated page.

BRIEF DESCRIPTION OF THE DRAWINGS

Reference is next made to a brief description of the drawings, which are intended to illustrate several embodiments of the laminated page and the method of making the laminated page according to the present invention. The drawings and detailed descriptions which follow are intended to be merely illustrative, and are not intended to limit the scope of the invention as set forth in the appended claims.

FIG. 11 is a perspective view of a continuous strip of laminated pages during the manufacturing process before folding and transverse cutting has taken place.

DETAILED DESCRIPTION OF THE DEVICE

Figure 1:
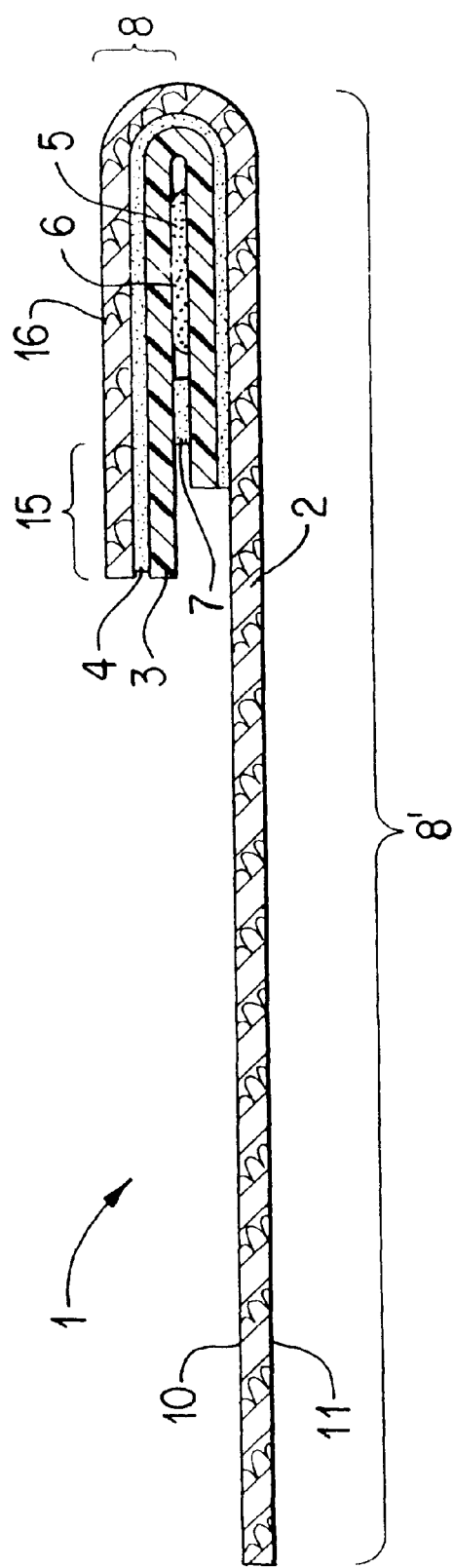
FIG. 1 is a cross-sectional view of a first embodiment of the laminated page.
Figure 2:
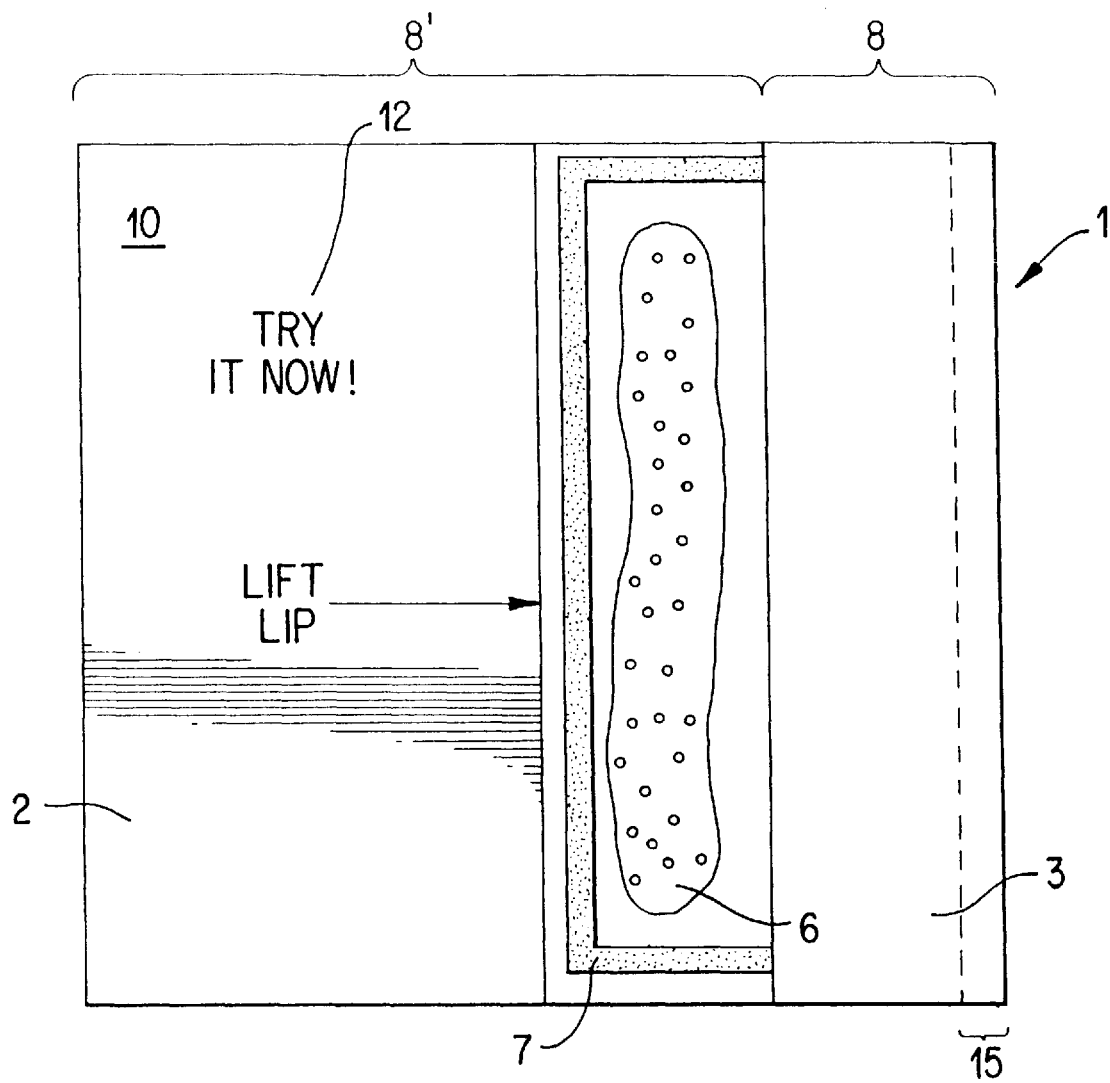
FIG. 2 is a plan view of a first embodiment of the laminated page.

FIGS. 1 and 2 represent a laminated page according to the first embodiment of the present invention. As shown in FIG. 1, the laminated page 1 comprises sample material 6 deposited within a barrier ply 3 which is laminated to a carrier sheet 2. The laminated page 1 shown in FIGS. 1 and 2 has a generally planar shape, but the laminated page of the present invention may be of various shapes. The barrier ply 3 is laminated to the carrier sheet 2 by laminating adhesive 4. In the first embodiment, the carrier sheet 2 is folded to form first panel 8 and second panel 8', which are two generally planar segments. Sample material 6 is located in the sample area 5 located between first and second panels 8, 8'. Closure adhesive 7 maintains the attachment between first and second panels 8, 8' until the laminated page 1 is opened by the user. The portion of the carrier sheet 2 from the closure adhesive 7 to the edge of the first panel 8 forms lip 15, which the consumer may seize and pull. When the lip 15 is pulled, the bond formed by closure adhesive 7 is broken, allowing the consumer to lift the first panel 8 and access the sample material 6. The lip 15 may comprise part of the carrier sheet 2 and the barrier ply 3, as shown in FIG. 1. Alternatively, the lip 15 may be an extension of carrier sheet 2 only, as in a second embodiment shown in FIG. 3, because it is not necessary for the barrier ply 3 to be flush with the edge of the carrier sheet 2. The lip 15 may also comprise an extension of the barrier ply 3 only. The construction and shape of the lip 15 is unimportant, as long as it allows the user to detach the panels 8, 8'.

FIG. 2 shows a plan view of the laminated page 1 before it has been folded. Barrier ply 3 is laminated to the full length of carrier sheet 2 with laminating adhesive 4 (not shown). As shown in FIG. 2, barrier ply 3 extends to three edges of the carrier sheet 2. Alternatively, the barrier ply 3 may be offset from any or all of the edges of the carrier sheet 2. The barrier ply may also be any shape. In another alternative embodiment, the barrier ply 3 may extend to all edges of the carrier sheet 2. Front surface 10 of the laminated page 1, as shown in FIGS. 1 and 2, is a suitable area to display advertising text or artwork 12 encouraging the consumer to sample the sample material 6. As shown in FIG. 1, advertising text and artwork 12 also may cover the front surface 16 of first panel 8. In addition, advertising text or artwork may be printed on both front surfaces 10, 16 such that when the laminated page 1 is folded as shown in FIG. 1, these surfaces 10, 16 may present a coordinated or continuous artwork or advertising message. Artwork or text may also be printed on the surface of the carrier sheet 2 underneath the barrier ply 3, or on the barrier ply 3 itself, such that the artwork or text becomes visible to the user of the laminated page 1 when it is opened. Back surface 11, as shown in FIG. 1, is also suitable for displaying text and artwork. It is contemplated that when the laminated page 1 is bound into publications such as magazines or catalogs with advertising text or artwork printed on one or both sides, it will look substantially similar to pages of advertisement typically found in magazines.

In the first embodiment, the carrier sheet 2 is made of paper stock. Paper of varying grades and compositions, including recycled, colored, textured, coated, or uncoated, may be used. A wide variety of materials, other than paper stock, also may be used in the present invention. Because the barrier ply 3 substantially isolates the carrier sheet 2 from the sample material 6, problems of incompatibility between the carrier sheet 2 and the sample material 6 are eliminated by the present invention.

The barrier ply 3 is preferably made of a clear polyester film. The material used to form barrier ply 3 should be substantially inert and impermeable to the contents of sample material 6 in order to substantially prevent migration of components of the sample material 6 through the barrier ply 3. Various types of plastic film may be used to form barrier ply 3 such as polyethylene terephtalate ("PET"), cellulosics or acetates. Depending on the components of the sample material, a barrier material may be chosen which is a barrier to, for example, oil, gas, water vapor, aroma, or oxygen. The properties of these and other barriers are documented in publications, and they are readily available from commercial suppliers. The plastic film may be clear or opaque, oriented or non-oriented, coated or uncoated, metalized, laminated with other materials, reinforced, or filled. In addition, coated or laminated paper, or any other paper grades which may be more compatible with the sample material 6 than the carrier sheet 2, may be used to form barrier ply 3. The barrier ply 3 may also carry certain decorative features such as holographic images, embossing, hot stamping, and the like. It will be apparent to those skilled in the art that any material with appropriate properties may be used to form barrier ply 3. In addition, a material that does not possess barrier properties may be coated or treated in order to give it barrier properties so that the material may be used to form barrier ply 3. Furthermore, certain biodegradable materials (such as certain papers treated with polyvinyl alcohol) are suitable for use as a barrier ply. The barrier ply may also comprise a filled sheet. The filler may impart opacity or texture to the surface of the barrier ply, or may contain antioxidants or other stabilizing components to protect the sample material. The choice of barrier ply material depends on factors such as cost, weight, ease of use, desired transparency or opaqueness, and suitability for displaying printed text and artwork (see discussion below regarding embodiments wherein the barrier ply is visible to the consumer). The material chosen can be pre-inspected and tested if desired to confirm that it provides the necessary barrier properties when used in combination with the sample material, carrier sheet, and adhesives selected for the laminated page.

It should also be noted that barrier ply 3 may comprise more than one layer of material. Multiple layers may give the barrier ply 3 additional or improved properties or an enhanced appearance. An inner layer, which is in direct contact with sample material 6, may be chosen based on its compatibility with sample material 6. An outer layer may be selected to provide more secure lamination to carrier sheet 2. The layers of a multi-layered barrier ply 3 may be adhered together by many different methods which are known in the art.

Preferably, the barrier ply 3 is 0.5 mil thick (1 mil=24.5 microns). However, the thickness of the barrier ply 3 may vary within a certain range. The bottom of the range is determined by the technology available to produce the barrier ply substantially without pin holes. The top of the range is determined by aesthetic considerations, the desired flatness of the entire laminated page, and cost. The preferred range of barrier ply thickness is from around 10 microns to around 500 microns.

The barrier ply 3 is laminated to the carrier sheet 2 with the laminating adhesive 4 as shown in FIG. 1. Those skilled in the art will recognize that many different adhesives are suitable to accomplish this lamination. Adhesives activated by heat, moisture, pressure, drying or radiation curing may be suitable. Water-based latex adhesives are preferable for lamination on paper because of their low cost and ease of application in-line on a print station. However, 100% solid adhesives such as hot-melt adhesive would be preferred for lamination of plastics. In addition, other attachment means may be used. For example, the barrier ply 3 may be heat laminated to the carrier sheet 2.

In the embodiment pictured in FIG. 1, the laminating adhesive 4 covers the entire contact area between the carrier sheet 2 and the barrier ply 3. Alternatively, the laminating adhesive 4 may be applied in a pattern of lines or dots, or just a few spots of adhesive may be used to keep the barrier ply 3 in place. Furthermore, the laminating adhesive 4 may be permanent or it may be peelable, allowing the consumer to remove the barrier ply 3 to expose additional artwork or the like on the carrier sheet 2 beneath the barrier ply 3. A removable barrier ply 3 may also facilitate use or application of the sample material 6 or allow the user to save some or all of the sample material 6 in the barrier ply 3 for later use. For similar purposes, the carrier sheet 2 may be perforated such that the user can remove the section or sections of the laminated page 1 containing the sample material from the rest of the magazine in which the laminated page 1 may be bound. A transparent material for the barrier ply 3 and laminating adhesive 4 may be used if the advertiser wishes text or artwork beneath the barrier ply 3 to be visible to the consumer while using the laminated page 1. In an embodiment incorporating a transparent barrier ply 3, a laminating adhesive 4 cured by light may be desirable. Some materials which may be used to form the barrier ply 3 already have a laminating adhesive attached thereto in which case application of additional laminating adhesive 4 may be unnecessary. Also, special adhesives may be formulated to provide additional barrier properties. Such adhesives may contain agents such as oxygen scavengers or consist of film-forming precursors of high-barrier materials, such as latex-grade polyvinylidene chloride (PVdC).

Sample material 6 is preferably a fragrance or cosmetic. Cosmetics include any external application intended to beautify or improve the complexion, skin, or hair. These include, for example, lipsticks, powders, foundations, mascaras, blushes, and eyeshadows. In addition to fragrances and cosmetics, a wide variety of sample materials may be included in the present invention, such as personal care products, medical treatments, or even food samples. In one embodiment, the sample material 6 is a substantially unadulterated product such as a liquid perfume, in which case a barrier ply material may be selected in accordance with the method disclosed in U.S. Pat. No. 5,439,172 to Comyn et al. However, suitable barrier ply materials for use with a liquid fragrance sample material are not limited to those disclosed in the Comyn et al. patent. Substantially unadulterated products include any sample materials presented in their original or natural form, without being altered in any significant way. In alternative embodiments, the sample material comprises a product which is presented in another form, such as in a gel form, in a powder form, in microcapsules, or contained in a matrix material. In addition, the sample material 6 may comprise volatile and/or non-volatile components. It will be readily apparent to those in the art that many other sample materials are suitable for use with the present laminated page and method. In the embodiment shown FIGS. 1 and 2, the sample material 6 does not cover the entire sample area 5. However, in alternative embodiments, the sample material 6 may cover the entire sample area 5. Furthermore, a single laminated page may contain a plurality of different sample materials.

The sample material may also contain a closure adhesive, in which case an additional closure adhesive 7 may not be necessary to keep the panels 8, 8' attached. For example, a microencapsulated sample material may be mixed in an adhesive-containing slurry. If desired, the adhesive may be resealable, such that the laminated page may be re-closed.

In the first embodiment, the closure adhesive 7 is peelable. As shown in FIG. 2, the closure adhesive 7, together with the fold in the barrier ply 3, forms a continuous seal between first panel 8 and second panel 8' around sample material 6. A complete seal of the sample area 5 compartment is preferred in this embodiment because it limits the lateral migration of the sample material 6 or its components. Substantially impermeable seals are also preferred in order to limit alteration, decomposition or spoilage of the sample material from exposure to air and vapors. The seal may be an adhesive seal, a heat-seal, or any other type of suitable seal.

Various alternative means may be used to form an attachment between first panel 8 and second panel 8'. For example, alternative adhesives may be used as long as the adhesive is stable with respect to the sample material 6, i.e., it should not react or become plasticized in an undesirable way when it comes into contact with the sample material 6 or components of the sample material 6. Alternatively, first panel 8 and second panel 8' may be attached together via heat sealing. In addition, the first panel 8 and second panel 8' may be resealably attached so that the panels 8, 8' may be reattached after opening. A combination of seals also may be used. Whatever attaching means is used must withstand the rigors of shipping and handling so that the laminated page 1 does not accidentally open. However, the bond must be capable of quick and easy opening without significantly damaging the laminated page 1.

The application and composition of closure adhesive 7 also may vary in alternative embodiments. Some sample materials such as dry powders or encapsulated materials may not require an airtight seal. Therefore, a few spots of closure adhesive 7 may be applied to the barrier ply 3 in order to maintain the attachment between the opposing surfaces of the barrier ply 3. In such an embodiment, sample area 5 is not completely enclosed.

Alternatively, the seal formed between the two opposing surfaces of the barrier ply 3 and around the sample material 6 may be a permanent seal. Permanent seals, also referred to as destruct or tear bonds, are also known in the art. Permanent seals also may be formed by adhesives or by heat sealing. If a permanent seal is used, it is advantageous to provide a means for opening the laminated page 1 to access the sample material 6, which likely will involve tearing the barrier ply 3. Such means are well known in the art and include a notch or a string to originate or facilitate the tear.

Figure 3:
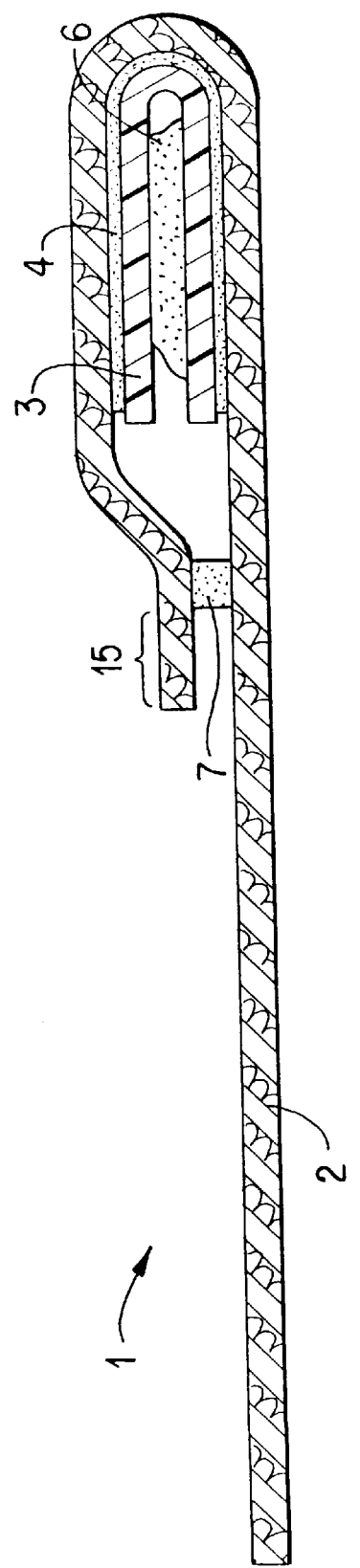
FIG. 3 is a cross-sectional view of a second embodiment of the laminated page.

Furthermore, it should be recognized that it is not necessary for the closure adhesive 7 to be positioned on the barrier ply 3 as shown in FIG. 1. As shown in FIG. 3, the closure adhesive 7 may be positioned on the carrier sheet 2 to keep the panels 8, 8' attached. Alternatively, the closure adhesive 7 may be positioned on the barrier ply 3 on one of the panels and/or the carrier sheet 2 on the other panel.

In certain alternative embodiments of the present invention, the closure adhesive 7 pictured in FIGS. 1 and 2 is not necessary. In one embodiment, for example, the barrier ply is made from a self-adhesive material which causes it to adhere to itself when its surfaces come into contact, or it is made from a film with a pre-manufactured, repositionable, pressure-sensitive adhesive layer, or a cohesively adhesive layer. Thus, opposing surfaces of the barrier ply will remain attached during shipping and handling of the laminated page, but will separate when the consumer seizes and lifts the lip. In an alternative embodiment, the material used for the barrier ply is a material suitable for embossing. Instead of applying a closure adhesive, the border of the sample area can be embossed, creating crimps. The crimps maintain contact between the opposing faces of barrier ply during trimming and normal shipping and handling without any additional adhesive material. When the consumer seizes and pulls the lip, the crimps yield, allowing access to the sample material. The embossing may be done in such a way as to create a decorative pattern of artwork or advertising text on the outside surface of the laminated page while simultaneously fastening the panels around the sample area in the manner just described. Crimping or embossing may also be used in combination with adhesives or heat-sealing means.

A number of alternative embodiments are contemplated in addition to the embodiments described above. In the second embodiment, shown in cross-section in FIG. 4, the carrier sheet 2 is not folded. Therefore, only the barrier ply 3 is folded to enclose the sample material 6. Thus the barrier ply 3 is visible to the consumer viewing the laminated page 1. The barrier ply 3 is made of an opaque material upon which artwork or advertisement is printed which, if desired, may be continuous with any artwork or advertisement printed on carrier sheet 2. Alternatively, the barrier ply 3, the laminating adhesive 4, and the sample material 6 may be made of substantially transparent materials, allowing the consumer to see artwork or advertisements on the carrier sheet 2 underneath the layers of barrier ply 3. The laminating adhesive 4 may be colored or opaque and arranged in a decorative pattern which the advertiser wishes the consumer to view through a transparent barrier ply 3 and transparent sample material 6. In addition, the material used for the barrier ply 3 may be selected for its transparency to visible light or other types of radiation so that the closure adhesive 7 can be activated by irradiation through the barrier ply 3. Alternatively, the barrier ply 3 may be made of a material upon which an ornamental design is embossed. Furthermore, the folded barrier ply 3 need not be located at the edge of the carrier sheet 2, since it is folded independently of the carrier sheet 2. Thus, the barrier ply 3 may be located anywhere on the surface of the carrier sheet 2.

Furthermore, it should also be noted that the barrier ply 3 may be oriented in any way on the carrier sheet 2. For example, the barrier ply 3 could be oriented such that lip 15 is located on the right-hand edge of the barrier ply 3 while the fold in the barrier ply 3 would be located on the left. Similarly, the lip 15 could be located at the top of the barrier ply with the fold located at the bottom, or the lip 15 could be located at the bottom of the barrier ply with the fold located at the top. It will also be apparent that the size and shape of the barrier ply may be altered in alternative embodiments. For instance, the barrier ply 3 can be reduced to the size of a small patch which is laminated to the carrier sheet 2.

Figure 5:
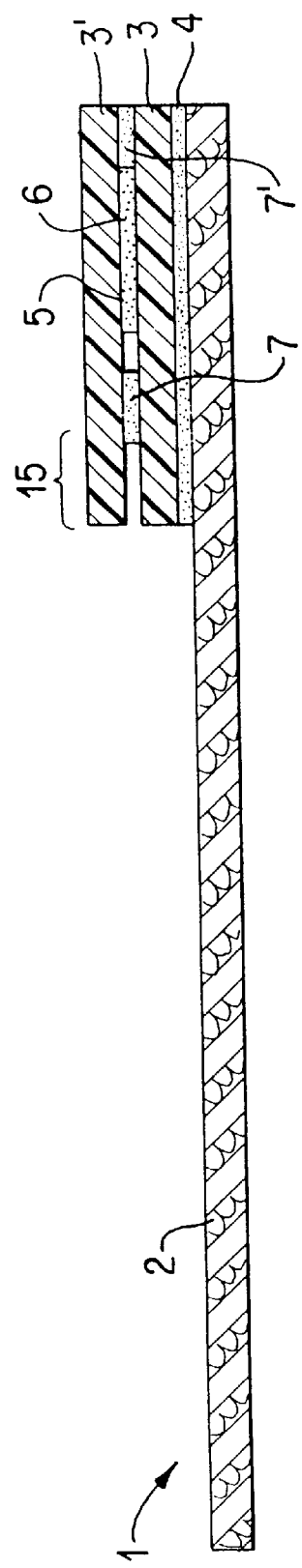
FIG. 5 is a cross-sectional view of a fourth embodiment of the laminated page.

The embodiments described above feature a single barrier ply 3 which is folded to create a sample area 5. In the third embodiment of the present invention the sample area 5 is bounded by two separate barrier plies 3 and 3', as shown in FIG. 5. Barrier ply 3' may be placed on top of sample material 6 and barrier ply 3 during the manufacturing process. Alternatively, the two barrier plies 3 and 3' may be formed from a single barrier ply which has been folded over as in previously described embodiments and then trimmed at the fold to divide the ply into two pieces. (See Detailed Description of the Method of Making the Laminated Page, below.) This two-barrier ply embodiment may require additional closure adhesive 7' as shown in FIG. 5 to maintain secure attachment between the two barrier plies 3, 3'. Additional closure adhesive 7' may simply form a continuous peelable seal with closure adhesive 7 and comprise the same materials which compose closure adhesive 7. Alternatively, additional closure adhesive 7' may be a permanent bond which maintains a hinge between the two layers of the barrier ply 3 when the bond formed by the peelable closure adhesive 7 is broken to access the sample material 6. An advantage of the embodiment pictured in FIG. 5 is that it may be trimmed to fit flush with the pages of a magazine or catalog without damaging the sample area 5 or precipitating pre-release of the sample material 6.

Figure 6:
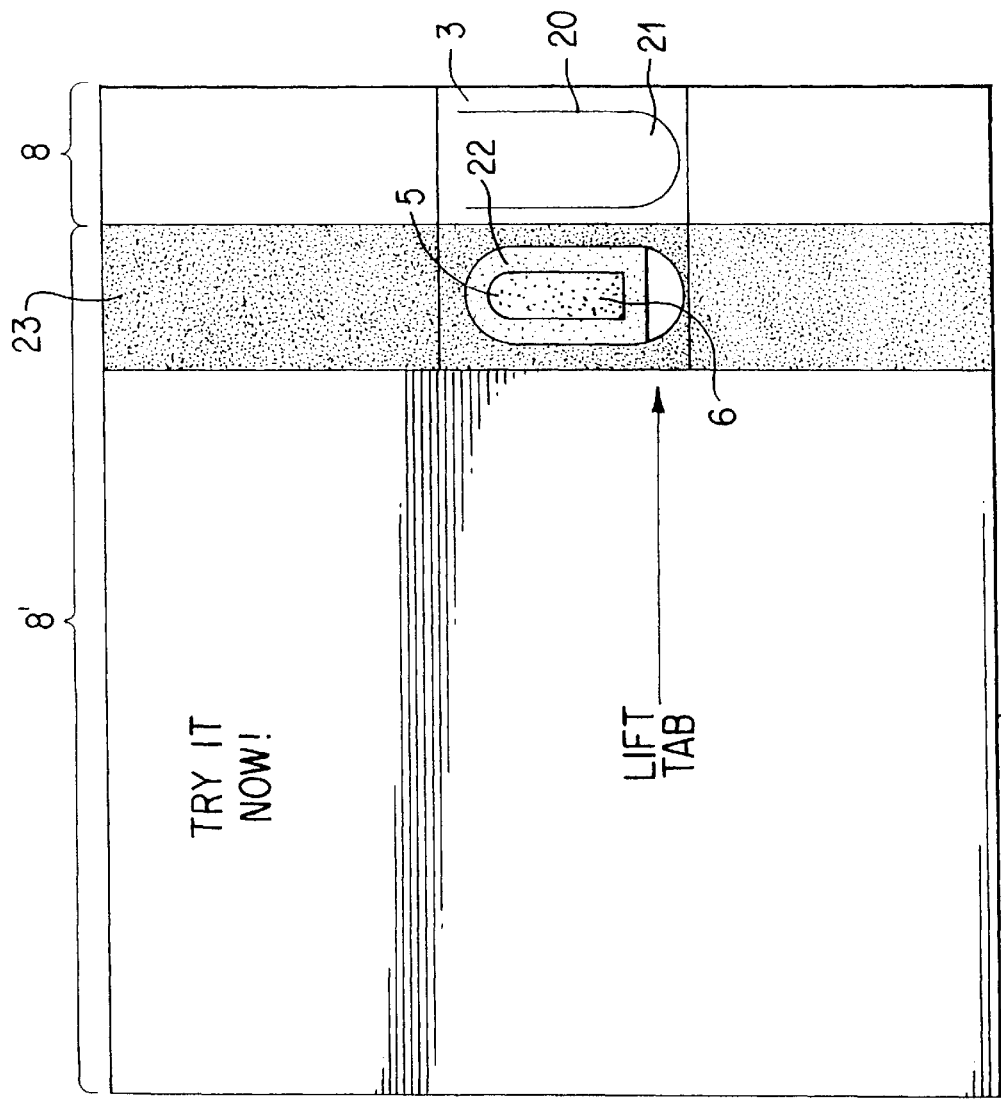
FIG. 6 is a plan view of a fifth embodiment of the laminated page.

The laminated page of the present invention may include some features of samplers known in the art. For example, the embodiment shown in FIG. 6 incorporates a lift tab 21 for accessing the sample material 6. A portion of first panel 8 is permanently attached to second panel 8' by permanent adhesive 23 and is not designed to be lifted by the consumer. Instead, lift tab 21 provides access to the sample material 6. Lift tab 21 is positioned adjacent to sample area 5, and it is formed by die-cutting a line 20 through the carrier sheet 2 and the barrier ply 3 of the first panel 8. The line 20 may form a continuous, closed shape, or may terminate in an open shape as shown in FIG. 6. Lift tab 21 is held in place by peelable adhesive 22. Alternatively, line 20 may be a perforated line or a die-cut line with notches or breaks. In this case, peelable adhesive 22 would not be necessary in order to hold lift tab 21 in place. Lift tab 21 extends through the carrier sheet 2 and the barrier ply 3, which is laminated thereto as described above. In this example of the embodiment, the barrier ply 3 does not extend to the entire length of the carrier sheet 2. Adhesive 22 may be resealable, allowing the consumer to replace lift tab 21 over the sample material 6. FIG. 6 shows the laminated page before it has been folded, so that the areas of permanent and resealable adhesive can be seen clearly. In the finished laminated page, the first panel 8 is folded over and attached to second panel 8'. The permanent closure adhesive 23 and the resealable closure adhesive 22 should be arranged so that the lift tab 21 does not come into contact with the permanent adhesive 23, which would prevent the consumer from lifting the lift tab 21. As shown in FIG. 6, there is an area where no adhesive 22 or 23 has been deposited to facilitate lifting of the lift tab 21. It will be readily apparent to those skilled in the art that more than one sample area may be defined between the opposing surfaces of the barrier ply 3. Each sample area may contain a different sample material, and each sample area may be accessed by a separate tab. The tabs may be located either on the first panel, the second panel, or both panels.

Figure 7:
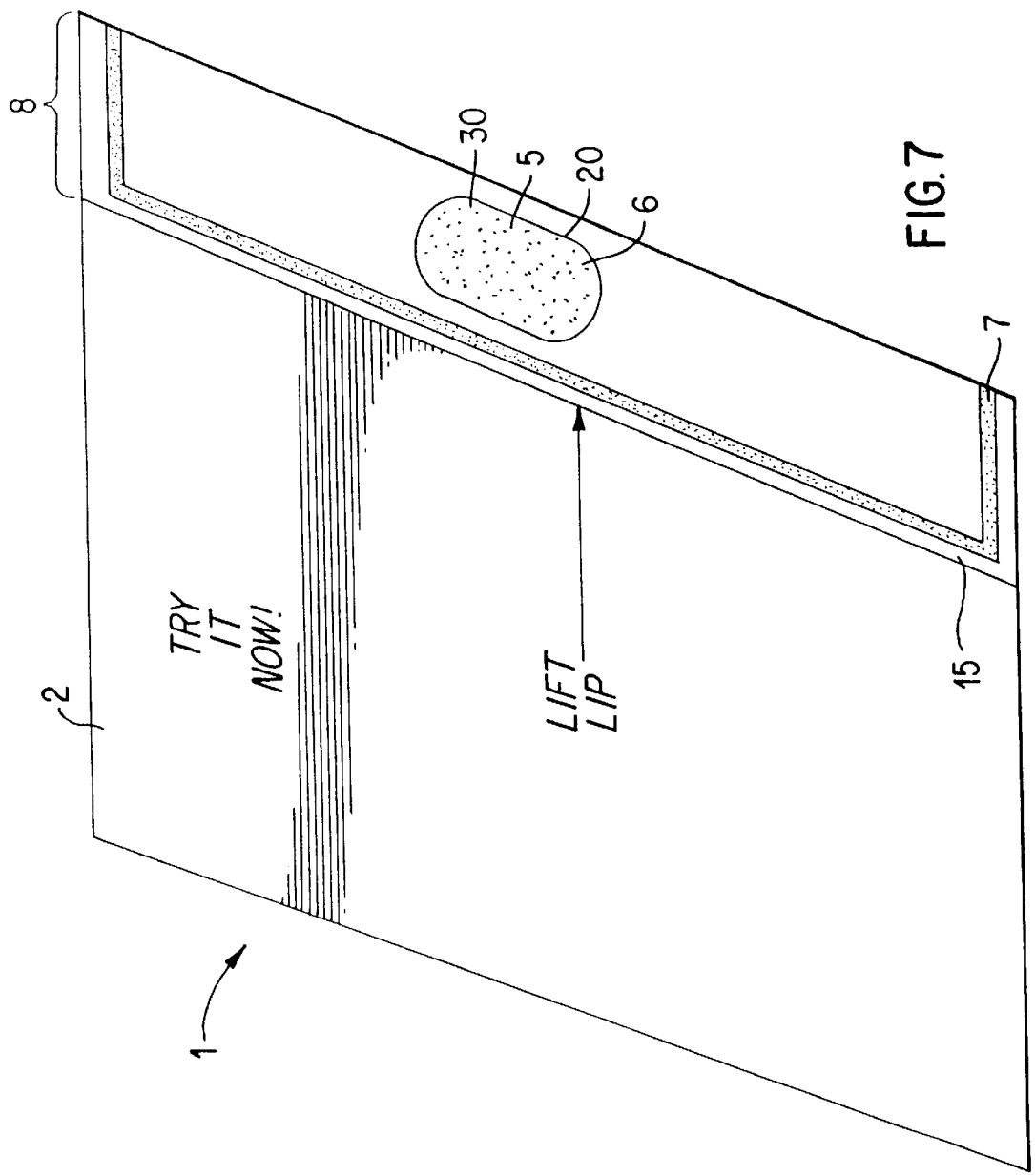
FIG. 7 is a perspective view of a sixth embodiment of the laminated page.

A sixth embodiment is shown in FIG. 7. This laminated page 1 maintains the same general structure and function as the previously discussed embodiments, but there is a closed die-cut line 20 in the carrier sheet 2 which defines a display aperture 30 where the carrier sheet 2 has been omitted or removed. This aperture 30 does not pass through the barrier ply (omitted from FIG. 7 for clarity), which remains intact. The barrier ply is transparent, and aperture 30 allows the consumer to view the sample material 6 without having to open the device 1. Allowing consumers to view sample materials may encourage them to try the sample material, particularly colored cosmetics. As will be readily apparent to those skilled in the art, multiple viewing apertures can be provided at different locations above the sample area 5. For example, a second viewing aperture can be provided on the back surface (not shown in FIG. 7) of the laminated page, either in alignment with the first aperture or offset from the first aperture. In an alternative embodiment, the portion of the carrier sheet 2 defined by the perforated or die-cut line 20 may be left in place, which allows the consumer to lift the portion to view the sample material 6 before opening the laminated page 1. It will be readily apparent to those skilled in the art that a plurality of die-cut lines may be incorporated in this embodiment to provide a plurality of viewing apertures and/or liftable portions.

Figure 8:
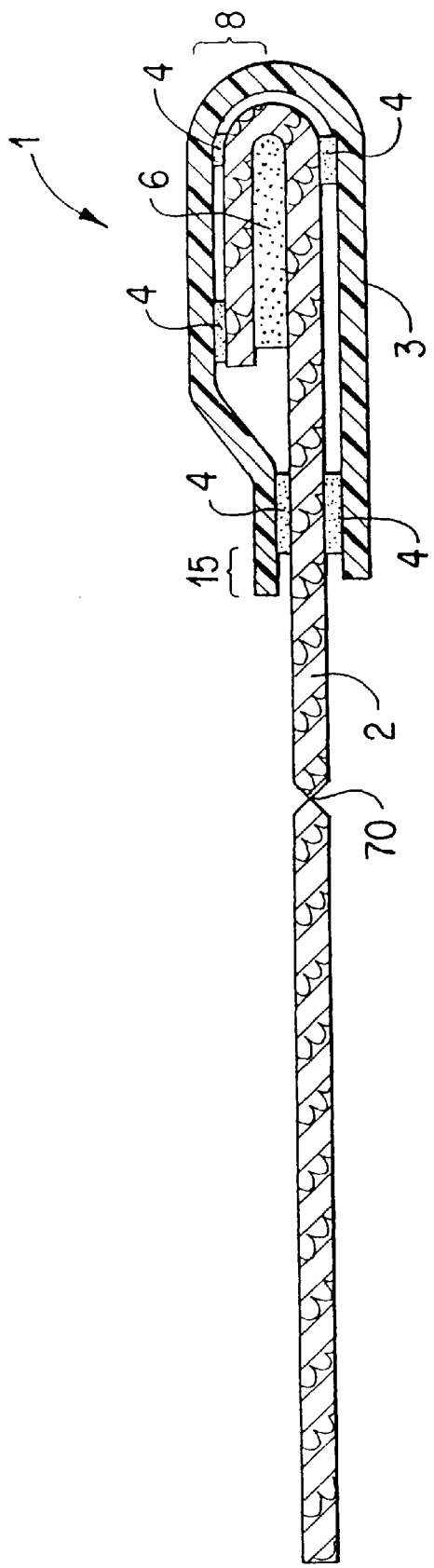
FIG. 8 is a cross-section of a seventh embodiment of the laminated page.
Figure 9A:
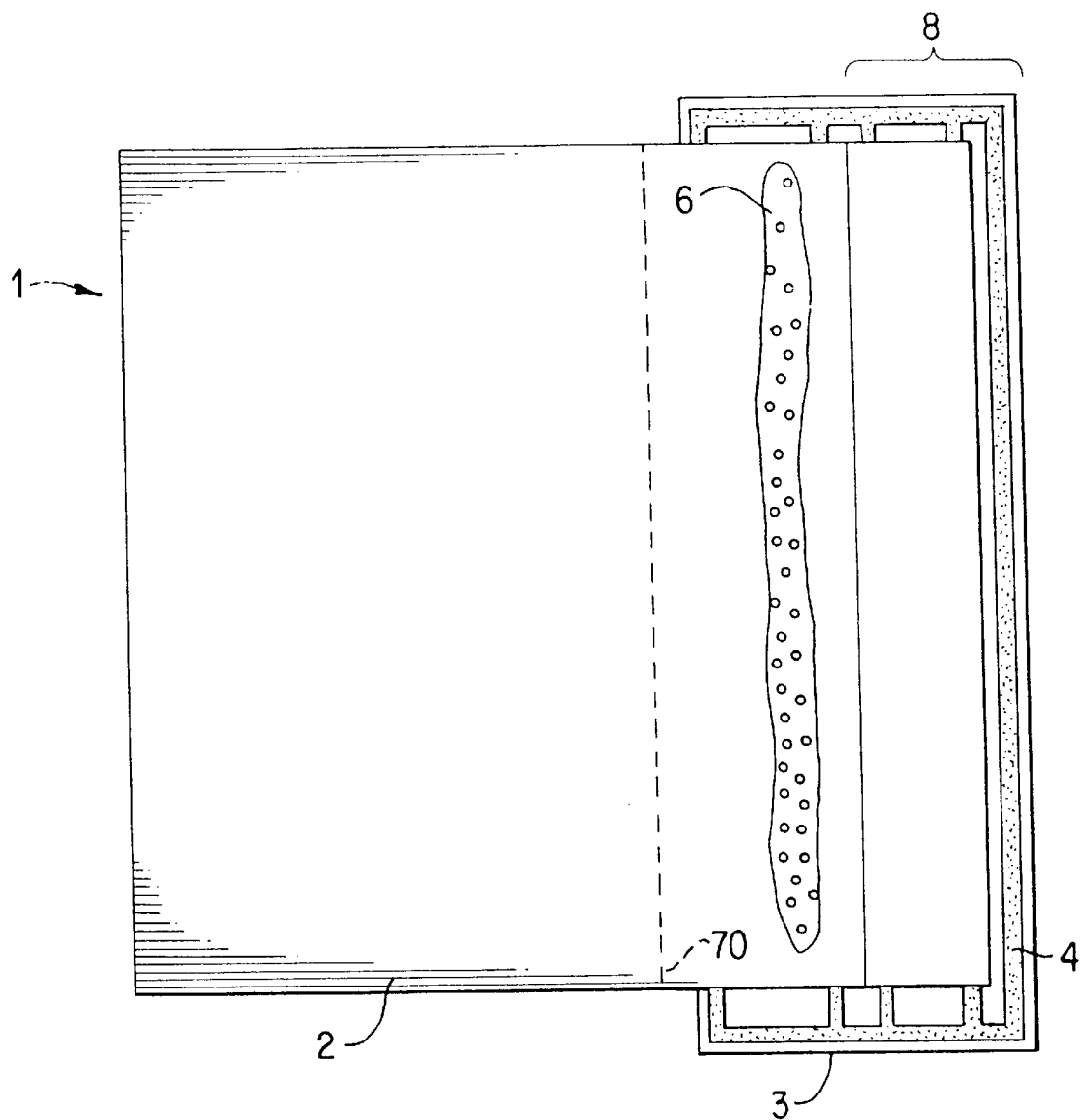
FIG. 9a is a plan view of the seventh embodiment of the laminated page in which the panels of the carrier sheet are open.
Figure 9B:
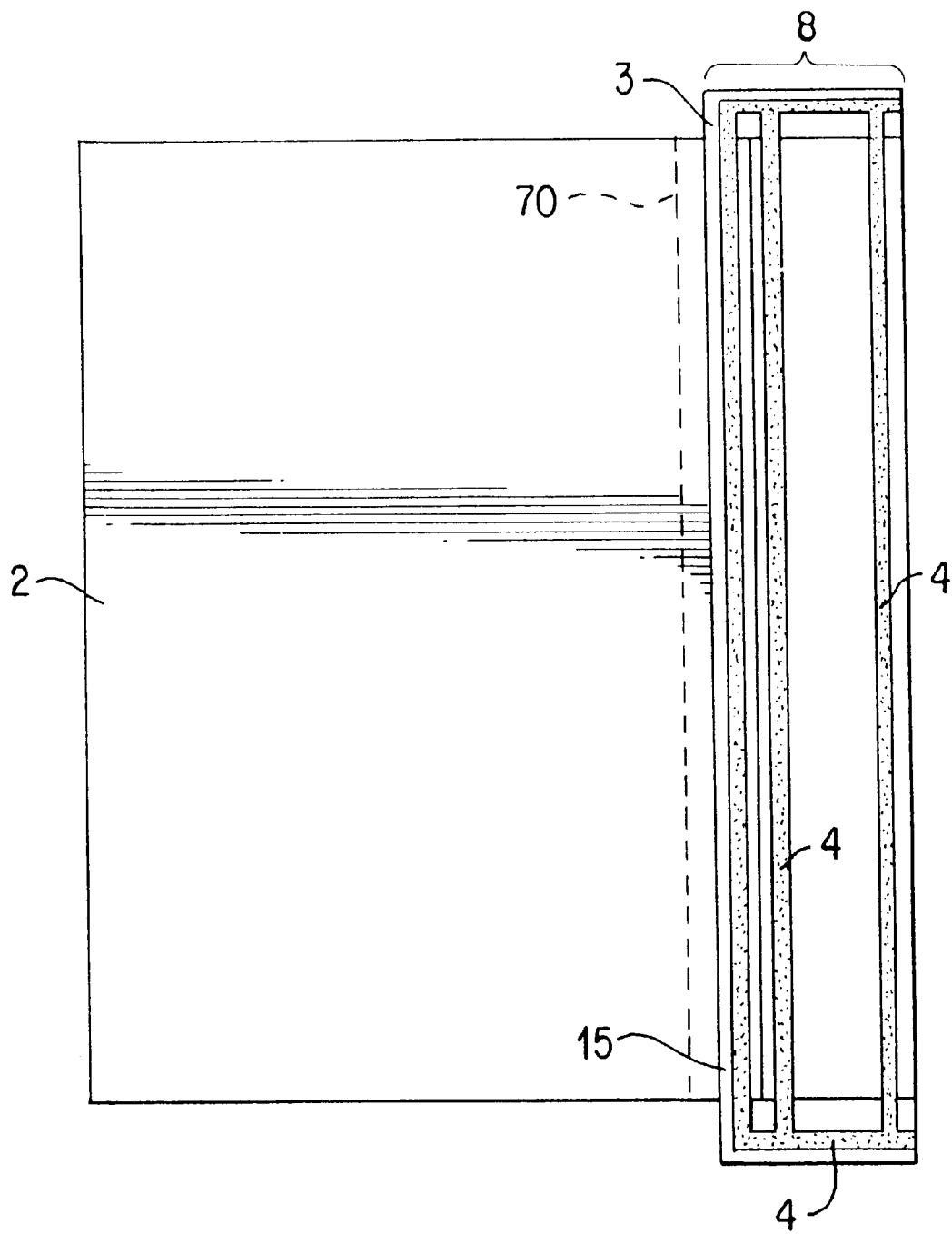
FIG. 9b is a plan view of the seventh embodiment of the laminated page in which the panels of the carrier sheet are closed.

The present invention also includes embodiments in which a barrier ply is laminated to the outside of the panels of the carrier sheet in order to seal in the sample material and the portion of the carrier sheet in contact with the sample material. For example, in a seventh embodiment pictured in FIGS. 8–9b, the sample material 6 (omitted from FIG. 9b for clarity) is enclosed between two panels of the carrier sheet 2, and the barrier ply 3 is laminated to the outside of the carrier sheet 2 by lines of adhesive 4. Opposing faces of the barrier ply 3 are attached together beyond the top and bottom of the carrier sheet 2, as shown in FIG. 9b. FIG. 9a shows a laminated page before closure, while FIGS. 8 and 9b show a device which has been closed. Although the sample material 6 is not isolated from the carrier sheet 2, this embodiment nonetheless provides the benefit of substantial protection from migration of the sample material 6 out of the laminated page 1 since the sample material 6 is covered by the barrier ply 3.

As shown in FIGS. 9a and 9b, opposing surfaces near or at the top and bottom edges of the barrier ply 3 are attached together by a line of adhesive 4. Any appropriate type of adhesive may be used. In addition, the barrier ply 3 may be heat laminated to the carrier sheet 2, and the opposing surfaces at the top and bottom edges of the barrier ply 3 may be heat-sealed together by trimming the edges with a hot knife. Alternative attachment means, such as are described above, may be used. Furthermore, the barrier ply material at the top and bottom edges may be folded in order to effect a seal. Although the barrier ply 3 may be completely sealed across the top and bottom of the carrier sheet 2, when a complete seal is not required, spots of adhesive may be applied at the top and bottom edges of the barrier ply 3 to attach the barrier ply 3 to itself beyond the top and bottom edges of the carrier sheet 2. Furthermore, the barrier ply 3 may also extend beyond the right or left-hand edges of the laminated page 1. In such cases, the opposing faces of the barrier ply 3 may be attached together as described for the top and bottom extending portions of barrier ply 3 shown in FIGS. 9a and 9b. In addition, the barrier need not be formed from a continuous sheet of material as shown in FIGS. 8–9b. The barrier could be formed from two or more discontinuous barrier plies enclosing the sample material 6 and carrier sheet 2. Furthermore, the carrier sheet 2 could also be formed from two or more discontinuous portions.

In alternative embodiments, when prevention of lateral migration of odors or sample material components is not a concern, the barrier ply 3 does not extend beyond the top and bottom edges of the carrier sheet 2. Edges of the barrier ply 3 may be flush with the top edge, the bottom edge or both edges of the carrier sheet 2. Alternatively, the barrier ply 3 may not extend fully to the top edge, the bottom edge, or either the top or bottom edge of the carrier sheet 2.

Heat or ultraviolet lamination or any alternative means of attachment, such as are described above, may be used to laminate the barrier ply 3 to the carrier sheet 2. The portion of the laminated page 1 containing the sample material 6 can be removed from the remainder of the laminated page 1, in a sealed enclosure, by tearing the line of perforations 70. Then lip 15 can be seized and lifted, releasing the sample material 6 as in previous embodiments. This line of perforations 70 may be incorporated into any of the above-mentioned embodiments to allow a section of the laminated page 1 containing the sample material 6 to be removed from the remainder of the laminated page 1. The shape of the line of perforations 70 may be altered in alternative embodiments. Furthermore, the lip 15 may be extended and attached to the carrier sheet 2 on the opposite side of the line of perforations 70. In such cases, the lip 15 will be held in place until the line of perforations 70 is torn, thereby detaching the lip 15 from the carrier sheet 2 and allowing the user to open the laminated page 1.

It should be noted that the barrier ply 3 and the carrier sheet 2 are not limited to the relative dimensions shown in FIGS. 8–9b. For example, the barrier ply 3 could be the size of a magazine page, while the laminated portion of the carrier sheet 2 could be smaller than the barrier ply 3.

In this type of embodiment, the sample material 6 contacts the carrier sheet 2. Therefore, the carrier sheet 2 must be made of a material that will not affect, degrade or contaminate the sample material 6. The preferred sample material comprises a fragrance. However, other types of sample material also may be included in this embodiment.

DETAILED DESCRIPTION OF THE METHOD OF MAKING THE LAMINATED PAGE

The method of making laminated pages according to the present invention is a continuous process which yields a large number of laminated pages easily and at high speed, and yields laminated pages with substantially reliable protection from premature exposure, leakage, or pre-release and from undesirable interaction between the sample material and the carrier sheet. The preferred method, shown schematically in FIG. 10, comprises a multi-stream, single-pass printing process with on-press lamination of barrier ply material which is slit in-line into multiple streams. FIG. 11 shows a section of a continuous stream of laminated pages 1 during the manufacturing process before transverse cutting has occurred. In the preferred method, several substantially parallel streams of laminated pages may be passed through the printing process simultaneously to increase the number of laminated pages produced. Alternatively, a single stream of laminated pages may be manufactured using the method of the present invention.

In the first step of the preferred method, a carrier sheet 2 is advanced from the supply roll 40 into the printing apparatus 42. After advertising text and/or artwork 12 is printed on the carrier sheet 2, the ink is dried, if necessary, by drier 43. Laminating adhesive (omitted from FIG. 11 for clarity) is applied at applicator 44.

Figure 10:
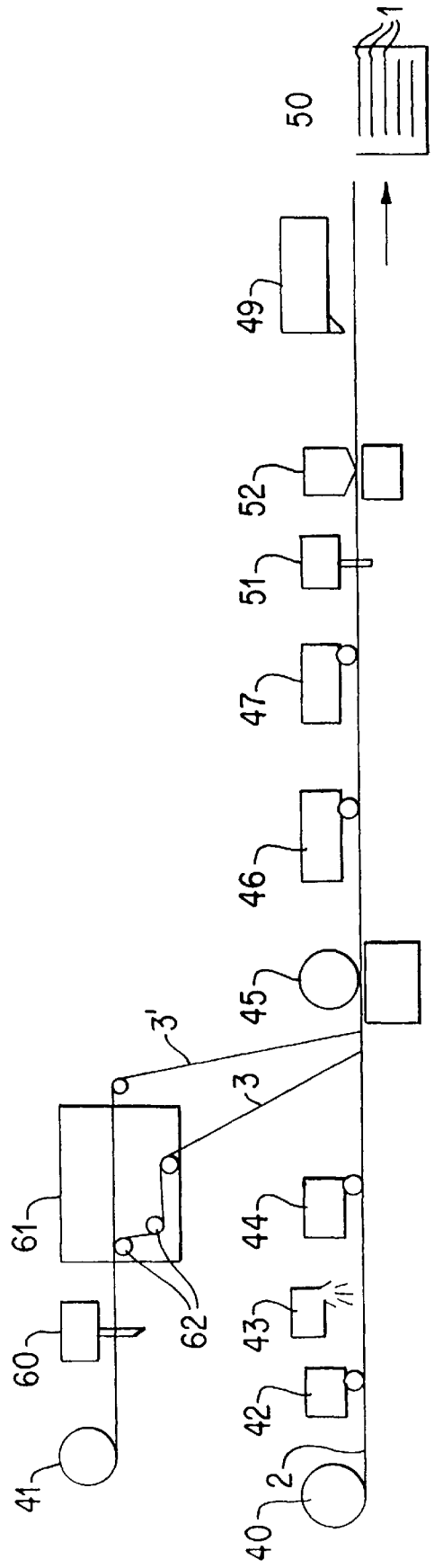
FIG. 10 is a schematic block diagram of a first method of making laminated pages.

Barrier ply material is introduced to the process in multiple ribbons. From the master supply roll 41, the barrier ply material is slit, in-line, into ribbons of appropriate width at slitting station 60. The ribbons are separated into individual barrier plies 3 and 3' by ribbon deck 61, which controls the spacing between the ribbons using turn bars 62. Only two ribbons of barrier ply 3, 3' are shown in FIG. 10. However, several ribbons of laminating barrier ply material may be provided by the ribbon deck 61 to allow multiple, parallel streams of laminated pages to be manufactured simultaneously. The barrier plies 3, 3' are positioned onto the carrier sheet 2. The barrier plies 3, 3' are then laminated to the carrier sheet 2 at the nip of pressure roller 45, which activates the adhesive force of the laminating adhesive.

Closure adhesive 7 is next applied by applicator 46. The position of the closure adhesive 7 will be determined by the type of attachment desired between the two panels of the laminated page 1 which are formed when the streams of laminated pages are folded. The closure adhesive may be positioned such that, after the laminated page is folded (see below), there will be attachment between the two opposing faces of the barrier ply 3 (as shown in FIG. 11), between the two opposing faces of the carrier sheet 2, or between one of the faces of the barrier ply 3 and the opposing carrier sheet 2. In the latter case, the size of the barrier ply 3 must be adjusted such that a portion of the barrier ply surface may be attached to the an opposing carrier sheet surface. After the closure adhesive 7 is deposited, the sample material 6 is deposited by applicator 47. The carrier sheet 2 then passes through longitudinal slitting station 51, which slits the carrier sheet 2 into a plurality of streams of laminated pages. The streams of laminated pages next pass through folder 52, which folds the devices along fold line 55 (shown in FIG. 11), enclosing the sample material 6 between two panels, the panels comprising layers of the barrier ply 3 and carrier sheet 2. The closure adhesive 7 maintains the laminated pages in the closed position. Finally, the continuous streams of laminated pages are cut along transverse cutting lines 56 by transverse cutter 49. Individual laminated pages 1 are then packed at packing station 50.

As described above in the Detailed Description of the Device, certain laminating adhesives require activation by, for example, heat, moisture, pressure, drying or radiation curing. Thus, although the laminating station 45 comprises a pressure roller in the above-described embodiment, the laminating station may comprise other appropriate laminating means depending on the type of bonding between the barrier ply and the carrier sheet.

The above-described process may contain fewer steps or additional steps, depending on the materials used and characteristics desired. For instance, choosing a self-adhesive material for the barrier ply 3 may eliminate the need for applicator 44. Alternatively, if a multi-layered barrier ply 3 is desired, the slitter 60 and ribbon deck 61 may be used to create additional ribbons of material which may be stacked to create a multi-layered barrier ply 3. In the case of full-page lamination, the barrier ply 3 is laminated to the carrier sheet in one continuous stream. Additional adhesive applicators and laminating stations may also be added to fasten the multiple layers together.

An alternative embodiment of the present method may be used to make the laminated page as pictured in FIG. 5. In the alternative method, the devices are not folded, but instead the sample material is enclosed between two separate barrier plies. The barrier plies 3, 3' comprise two separate ribbons. The first barrier ply ribbon is laminated to the carrier sheet, the sample material and closure adhesive are applied, and then the second barrier ply ribbon is applied over the sample area. The sample material 6 is thus completely covered as shown in FIG. 5. The laminated pages are then cut and packed as in other embodiments.

Figure 4:
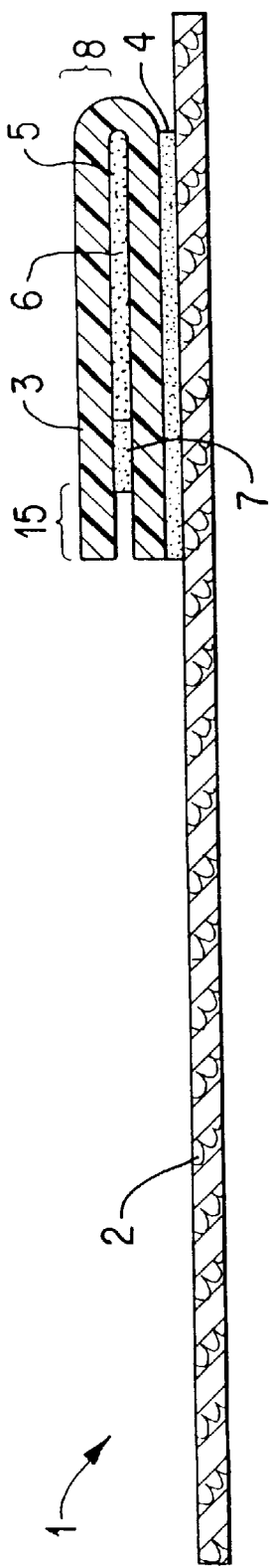
FIG. 4 is a cross-sectional view of a third embodiment of the laminated page.

Another method of making the laminated page involves laminating part of the barrier ply 3 to the carrier sheet 2, applying the sample material 6 and the closure adhesive 7 to the barrier ply 3, and then folding the barrier ply 3, but not the carrier sheet 2, to enclose the sample material 6 within the barrier ply 3, as pictured in FIG. 4. Yet another method of making laminated pages involves folding a single barrier ply 3 to close the sample area 5 and then trimming the fold itself from the laminated page, thereby dividing the barrier ply 3 into two pieces, 3 and 3', as shown in FIG. 5. Sufficient additional closure adhesive 7' must be applied in order to maintain a secure attachment between barrier plies 3, 3' and avoid pre-release of sample material 6. If additional closure adhesive 7' comprises the same material as closure adhesive 7, one applicator 46 may be sufficient to apply both as shown in FIG. 10. However, if two different adhesive means are employed, an additional applicator may be necessary.

In a method used to create a laminated page with a display aperture 30, as shown in FIG. 7, a die is employed to cut and remove a portion of the carrier sheet 2 in order to create the display aperture 30. This step may be done at any point in the process of creating the laminated pages. However, this step is preferably performed before the sample material is deposited.

Similarly, to create a laminated page having a lift tab 21 as shown in FIG. 6, a die is employed to cut the lift tab 21 in the carrier sheet 2, the laminating adhesive and the barrier ply 3. In addition, to make the fifth embodiment of the laminated page shown in FIG. 6, separate applicators may be used to apply the permanent and resealable adhesives 23 and 22. As shown in FIG. 6, the lift tab should not come into contact with the permanent adhesive 23, as that would prevent the tab from being lifted.

In addition, methods used to create embodiments involving embossed barrier plies described above require an embosser in the assembly process rather than a closure adhesive applicator. Also, the order in which the steps are performed may be altered in certain cases. For example, the sample material 6 could be deposited before, or contemporaneously with, the closure adhesive 7 without altering the utility of the method. The order in which the steps of the method are performed is not critical, as long as the continuity of the process is maintained.

In an alternative embodiment of the method, individual laminated pages would be separated from a large sheet by die-cutting, rather than by longitudinal slitting and transverse cutting. This would allow manufacturing of laminated pages having circular or other attractive shapes, instead of being limited to rectangular shapes.

Another alternative embodiment of the method is used to make laminated pages as pictured in FIGS. 8–9*b*. In this embodiment, the sample material is deposited on the carrier sheet 2, rather than the barrier ply 3. Longitudinal and transverse cutting of the carrier sheet 2 may be done before the barrier ply 3 is attached, to allow construction of laminated pages in which the barrier ply 3 extends beyond the top and bottom edges of the carrier sheet 2, as shown in FIGS. 9*a* and 9*b*.

These variations are offered by way of example and not limitation, as it will be readily apparent to those in the art that many other variations of this method are possible which fall within the scope of the appended claims.

What is claimed is:

1. A method of making a laminated page comprising the steps of
   providing a first barrier ply and a second barrier ply;
   laminating at least one barrier ply to a carrier sheet;
   depositing a sample material onto at least one barrier ply; and
   enclosing the sample material between the barrier plies.

2. The method of making a laminated page according to claim 1, wherein the step of enclosing the sample material comprises folding the carrier sheet, thereby forming a first panel and a second panel, the first panel comprising a portion of the carrier sheet and the first barrier ply, and the second panel comprising another portion of the carrier sheet and the second barrier ply.

3. The method of making a laminated page according to claim 1, wherein the barrier plies are continuous and wherein the step of enclosing the sample material comprises folding the barrier plies at a fold line between the barrier plies.

4. The method of making a laminated page according to claim 1, comprising the additional step of slitting a web of barrier material to form the two barrier plies.

5. The method of making a laminated page according to claim 1, wherein the barrier plies are attached together such that a seal is formed substantially surrounding the sample material.

6. The method of making a laminated page according to claim 1, wherein the barrier plies are attached together such that a seal is formed substantially surrounding the sample material.

7. A method of making a plurality of laminated pages comprising the steps of:
   providing a plurality of first barrier ply ribbons and a plurality of second barrier ply ribbons;
   laminating the plurality of first barrier ply ribbons and the plurality of second barrier ply ribbons to a carrier sheet web;
   depositing portions of sample material onto the carrier sheet web;
   slitting the carrier sheet web into a plurality of carrier sheet streams, each carrier sheet stream having at least one first barrier ply ribbon and at least one second barrier ply ribbon laminated thereto;
   folding each carrier sheet stream, thereby forming a first panel and a second panel, the first panel comprising a portion of the carrier sheet stream and the first barrier ply ribbon, the second panel comprising another portion of the carrier sheet stream and the second barrier ply ribbon, and thereby enclosing the portions of sample material between the first and second panels; and
   cutting each carrier sheet stream, each first barrier ply ribbon and each second barrier ply ribbon into individual laminated pages, wherein each laminated page contains at least one portion of sample material.

8. The method of making a plurality of laminated pages according to claim 7, wherein each of the first barrier ply ribbons are continuous with each of the second barrier ply ribbons.

9. A method of making a laminated page comprising the steps of:
   slitting a web of barrier material to form a first barrier ply and a second barrier ply;
   laminating at least one barrier ply to a carrier sheet;
   depositing a sample material onto at least one barrier ply; and
   enclosing the sample material between the barrier plies.

10. The method of making a laminated page according to claim 9, wherein the step of enclosing the sample material comprises folding the carrier sheet, thereby forming a first panel and a second panel, the first panel comprising a portion of the carrier sheet and the first barrier ply, and the second panel comprising another portion of the carrier sheet and the second barrier ply.

11. A method of making a plurality of laminated pages comprising the steps of:
   providing a plurality of first barrier ply ribbons and a plurality of second barrier ply ribbons;
   laminating at least one of the plurality of first barrier ply ribbons and the plurality of second barrier ply ribbons to a carrier sheet web;
   depositing portions of sample material onto at least one of the plurality of first barrier ply ribbons and the plurality of second barrier ply ribbons;
   slitting the carrier sheet web into a plurality of carrier sheet streams, each carrier sheet stream having at least one barrier ply ribbon laminated thereto;
   enclosing the portions of sample material between the plurality of first barrier ply ribbons and the plurality of second barrier ply ribbons; and cutting each carrier sheet stream, each first barrier ply ribbon and each second barrier ply ribbon into individual laminated pages, wherein each laminated page contains at least one portion of sample material.

12. The method of making a plurality of laminated pages according to claim 11, wherein each of the first barrier ply ribbons are continuous with each of the second barrier ply ribbons and wherein the step of enclosing the portions of sample material comprises folding the barrier ply ribbons at fold lines between the first and second barrier ply ribbons.

13. The method of making a plurality of laminated pages according to claim 12, wherein the step of enclosing the portions of sample material also comprises folding the carrier sheet streams.

14. The method of making a plurality of laminated pages according to claim 11, wherein the step of enclosing the portions of sample material comprises folding the carrier sheet web, thereby forming a plurality of first panels and a plurality of second panels, each first panel comprising a portion of the carrier sheet web and one first barrier ply ribbon, and each second panel comprising a portion of the carrier sheet web and one second barrier ply ribbon.

* * * * *